Aug. 12, 1952 C. L. NORDEN ET AL 2,606,448
MASTER GYROSCOPE SYSTEM
Filed March 22, 1946 8 Sheets-Sheet 1
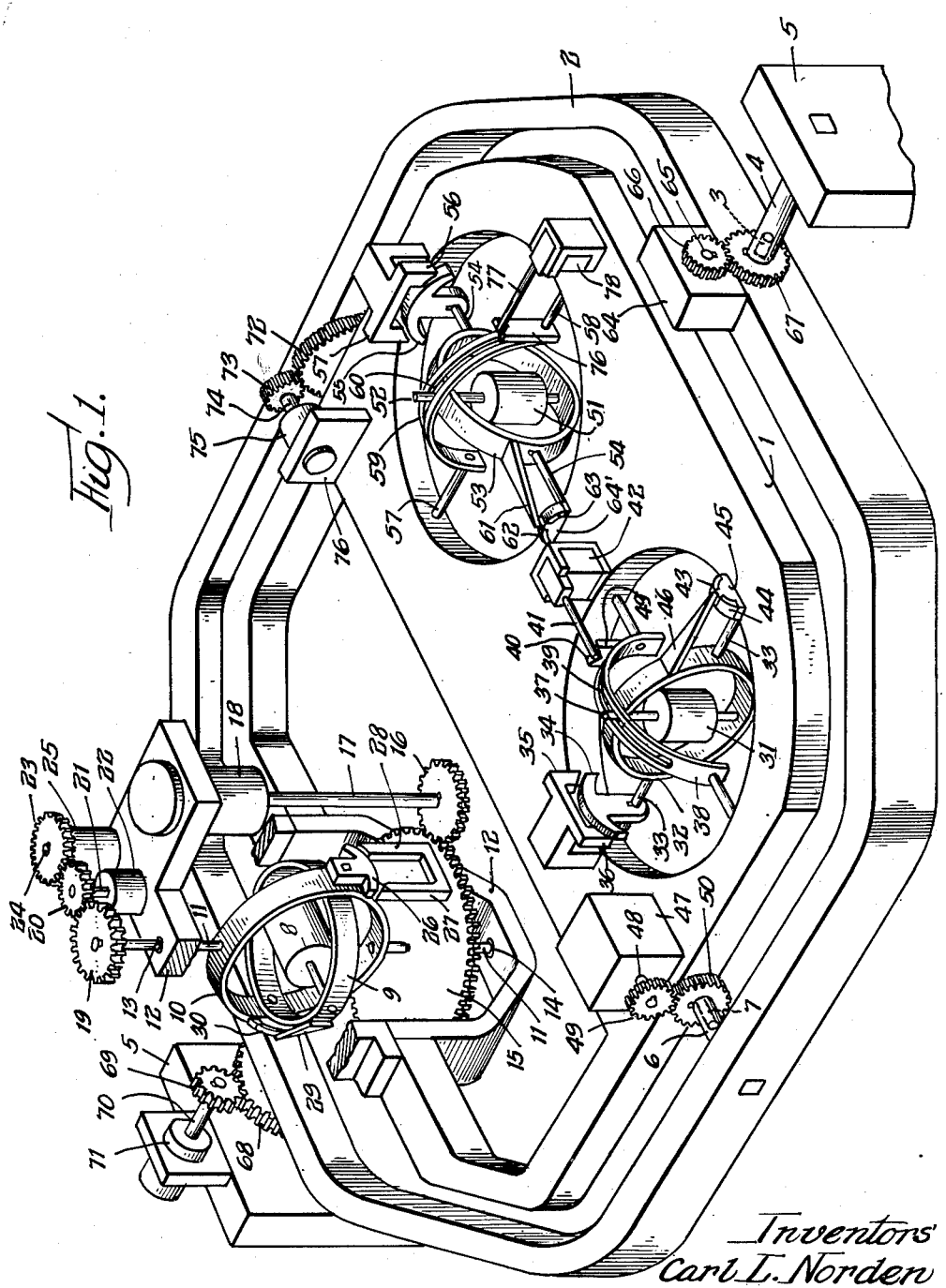
Inventors
Carl L. Norden
William C. Coulbourn
By:— Moore, Olson & Trexler

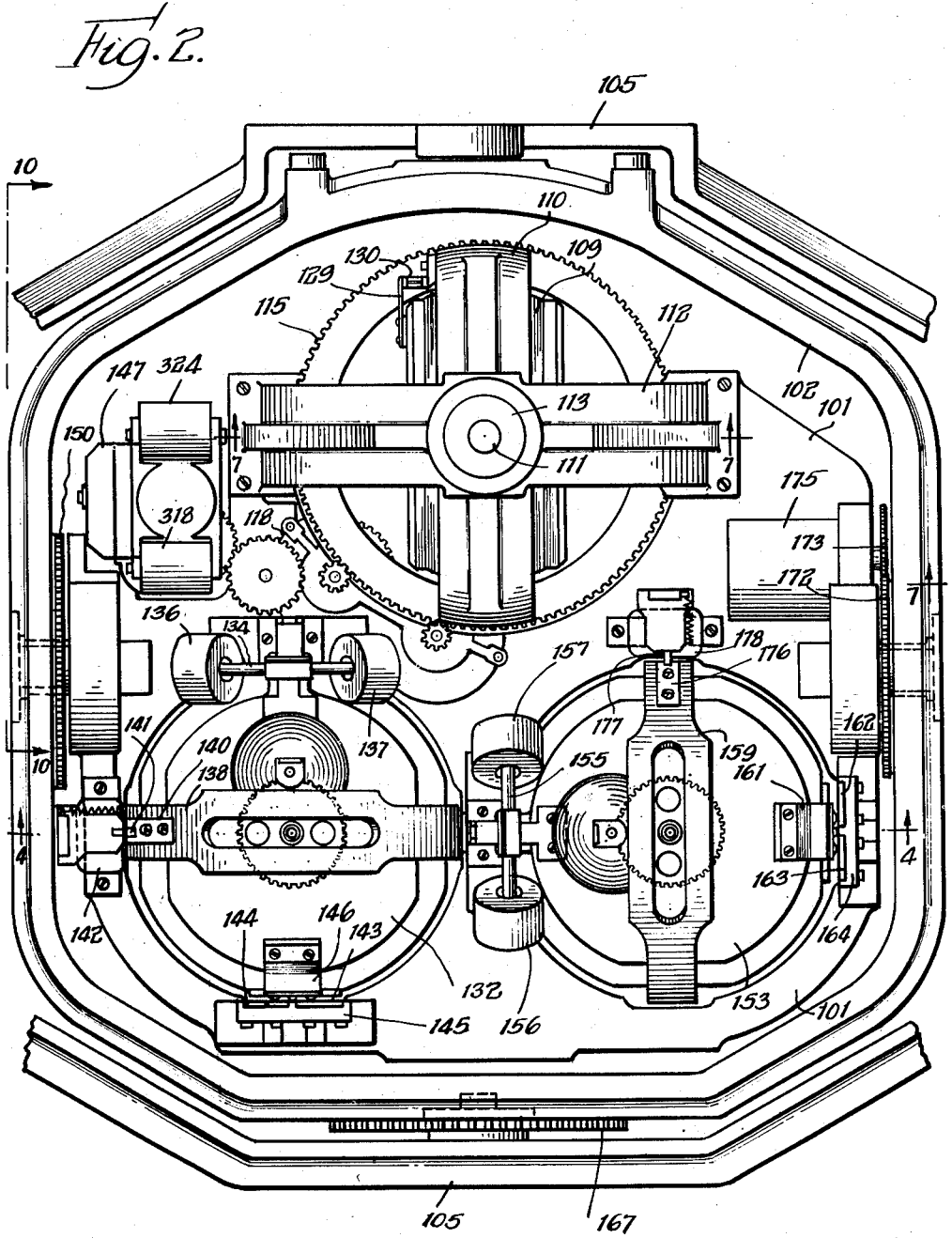

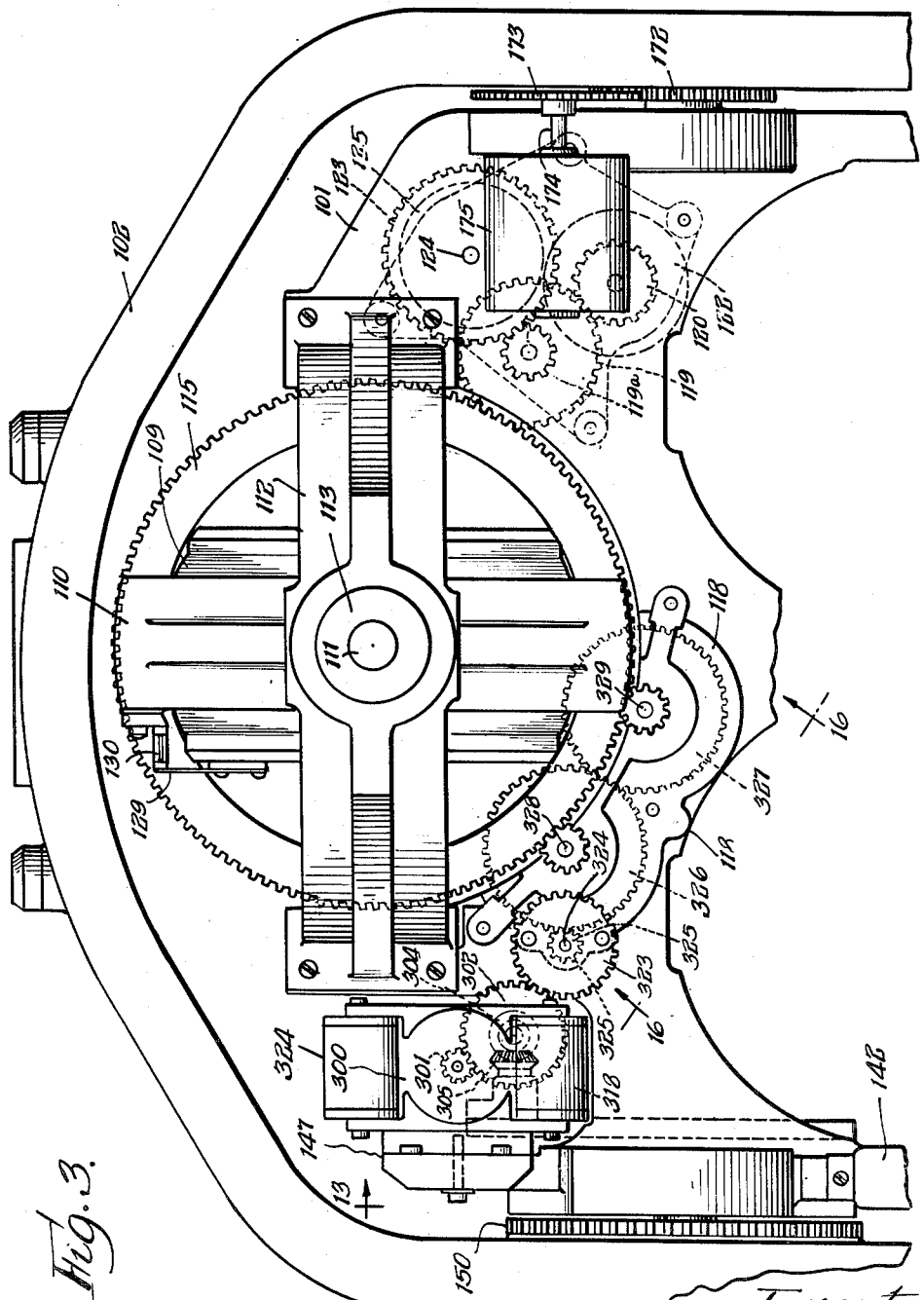

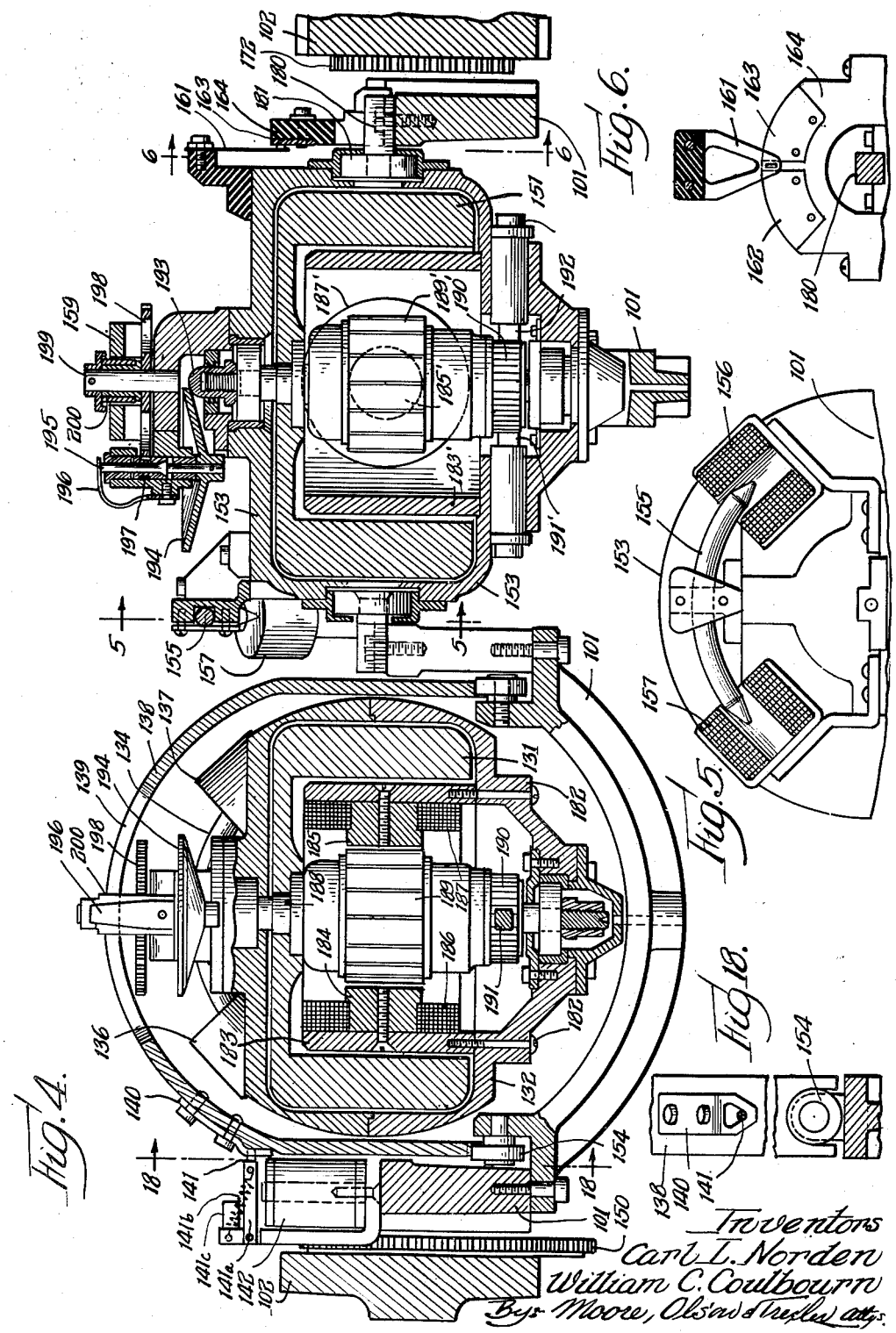

Aug. 12, 1952  C. L. NORDEN ET AL  2,606,448
MASTER GYROSCOPE SYSTEM
Filed March 22, 1946  8 Sheets-Sheet 5
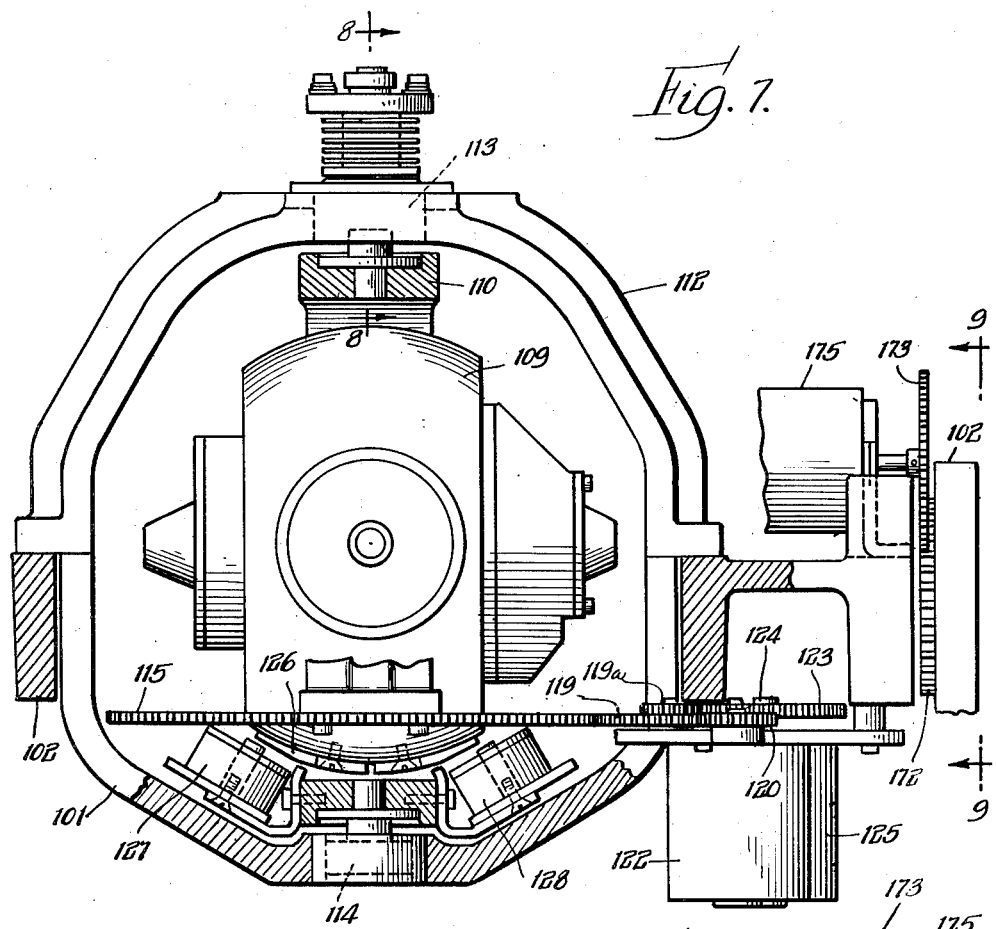
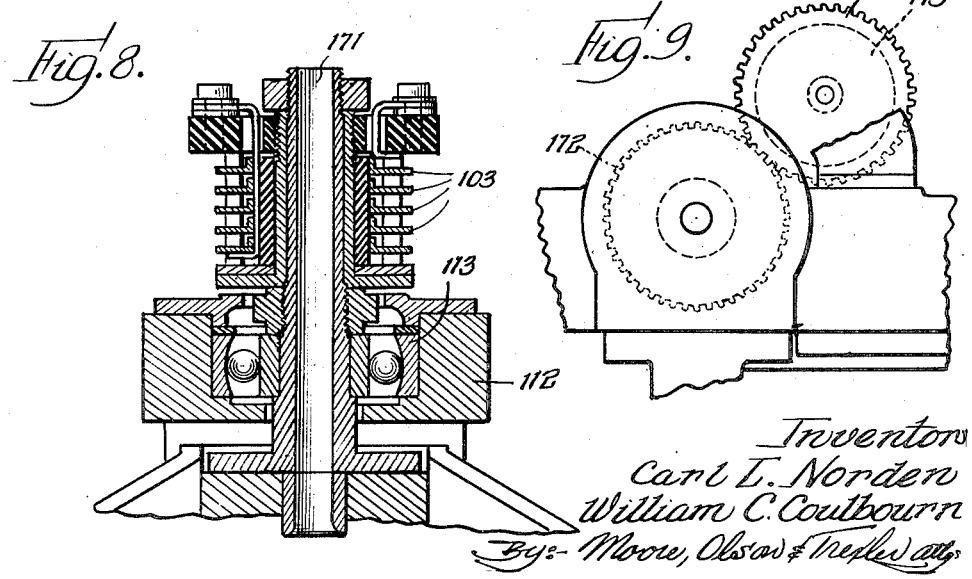
Inventors
Carl L. Norden
William C. Coulbourn
By: Moore, Olson & Trexler attys Aug. 12, 1952 — C. L. NORDEN ET AL — 2,606,448
MASTER GYROSCOPE SYSTEM
Filed March 22, 1946 — 8 Sheets-Sheet 6

Inventors
Carl L. Norden
William C. Coulbourn
By: Moore, Olson & Trexler
Attys

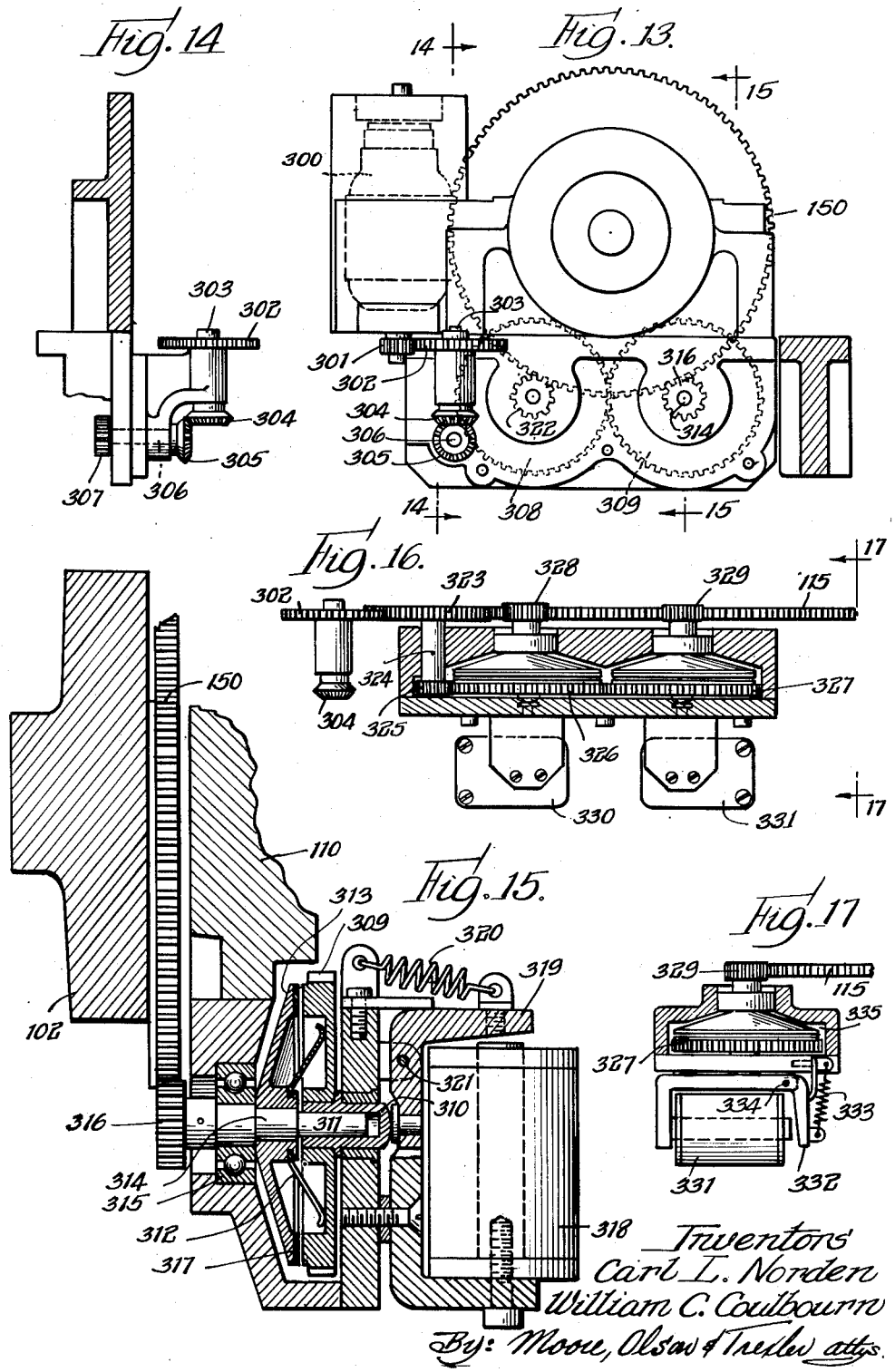

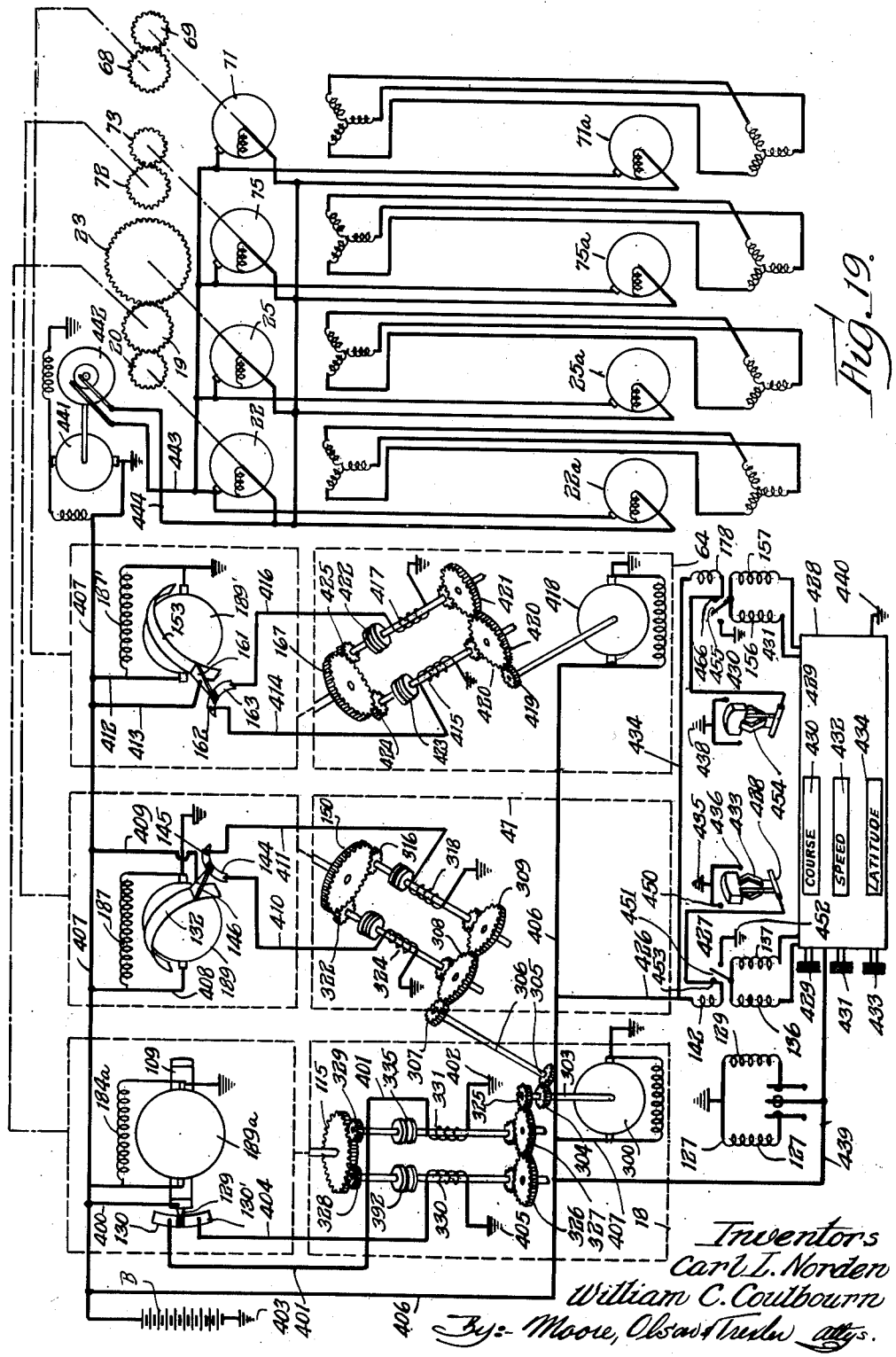

Patented Aug. 12, 1952

2,606,448

UNITED STATES PATENT OFFICE 2,606,448

MASTER GYROSCOPE SYSTEM

Carl L. Norden, New York, and William C. Coulbourn, Mineola, N. Y., assignors to The Norden Laboratories Corporation, New York, N. Y., a corporation of Connecticut Application March 22, 1946, Serial No. 656,176

9 Claims. (Cl. 74—5.34)

Our invention relates to a master gyroscope system, and more particularly to one which is adapted to provide a stabilized platform upon which may be mounted an azimuth gyroscope and from which any deviation about the vertical or yaw axis, the transverse or pitch axis, and the longitudinal or roll axis of a craft such as an aircraft, vessel, or the like, may be measured.

In the prior art, azimuth gyroscopes, that is gyroscopes adapted to indicate the direction in which the plane was traveling were mounted by a suspension system in which the vertical axis was rigid with the airplane. Due to precession of the gyroscope, when the plane would climb or dive or when the plane rolled about a longitudinal axis, as in banking for a turn, errors were introduced. Then too, the relative motion between the airplane and the Cardan ring of the gyroscope had to be transmitted to an indicating instrument through an appropriate follow-up system. This required work which introduced further forces tending to precess the azimuth gyroscope from its set direction. Even if a photoelectric follow-up system were used, the friction in the gyroscope wheel and its suspension bearings is normally sufficient to cause precession. Then too, precession is caused by the rotation of the earth and by movement of the plane about the earth. The amount of precession furthermore varies in different latitudes. An airplane is a highly maneuverable vessel and its constant change in attitude and its acceleration and deceleration in flight make it extremely difficult to devise a gyroscopic system which will indicate true direction at all times so that it can be used for navigational purposes as well as to control surveying cameras, fire control apparatus, bombsight equipment, and an automatic pilot.

One object of our invention is to provide a master gyroscopic system which will provide a stabilized platform upon which is mounted an azimuth gyroscope which may be used to indicate the true direction in which the plane is flying at all times.

Another object of our invention is to provide a stabilized platform which is always normal to a line drawn through the center of the earth from the position of the plane or vessel and from which deviations of the craft about either the longitudinal or transverse axis thereof may be measured.

Another object of our invention is to provide a master gyroscopic system which may be used to control an aircraft's automatic pilot, bombsight equipment, fire control apparatus, photographic survey equipment, and the like.

Another object of our invention is to provide a stabilized platform which will be maintained normal to a line drawn through the center of the earth irrespective of the attitude, course, speed, or latitude of the plane.

Another object of our invention is to provide a stabilized platform which will remain in a position normal to a line drawn through the center of the earth, irrespective of the maneuvers of the plane and the acceleration or deceleration of the plane.

Another object of our invention is to provide a novel means for precessing a gyroscopic system.

Another object of our invention is to provide a gyroscopic system which will deliver considerable and usable torque about the axes of control so that follow-up systems such as synchronous transmitters may be operated by the movement of the stable platform relative to the vessel without introducing precession errors.

Other and further objects of our invention will appear from the following description.

In general, our invention contemplates the provision of a platform upon which are mounted three gyroscopes, each of which has a restrained axis, perpendicular to the axis of control of the respective gyroscope. The stabilized platform is maintained perpendicular to a line drawn through the center of the earth, irrespective of the movement of the craft upon which it is mounted. Upon the stable platform is mounted an azimuth gyroscope. Deviations of the aircraft about its roll or longitudinal axis are detected and measured by the change in angular relationship between the stabilized platform, Cardan ring and the main housing. Deviations in pitch of the aircraft are detected and measured by the change in the angular relationship between the stabilized platform and the Cardan ring about the horizontally stabilized pitch or transverse axis. Deviations of the aircraft in yaw or course are measured about a true vertical axis and not the aircraft's normal vertical axis, due to the fact that the azimuth gyroscope is mounted on the stable platform. These deviations are used to actuate the transmitters of synchronous systems and can be used to control equipment of any size or weight by suitable servomotors. For example, a complete gun platform may be stabilized by means of our gyroscopic system so that the problems of naval gunnery may be greatly simplified, irrespective of the pitch and roll of a naval vessel. Similarly, gun platforms on airplanes, as well as platforms for mounting aerial cameras, may be stabilized regardless of the pitch and roll of the airplane. Navigational instruments, bombsights, or automatic pilots may be controlled from a gyroscopic system of our invention.

We provide means for always maintaining the pitch gyroscope and the roll gyroscope with their axes of spin along a line drawn through the center of the earth, together with means for maintaining the stabilized platform normal to the axes of spin of the pitch and roll gyroscopes.

We provide means for locking erecting mechanisms during periods of acceleration and deceleration when centrifugal force or other forces would adversely affect the erecting mechanisms. Either constantly or only during the periods when the gravity erecting mechanisms are rendered inoperative, we provide magnetic means for precessing the gyroscopes to compensate for the change in latitude, the rotation of the earth, and the component of speed in the east-west direction which would alter the effect of the precession due to the rotation of the earth. In this manner, the stabilized platform is always maintained normal to a line drawn through the center of the earth and the azimuth gyroscope will always maintain a set direction. If this set direction be north, the azimuth gyroscope will act as a gyroscopic compass. The set direction, however, may be any desired direction, as for example the desired course on which the plane is to fly, thus making the instrument useful, not only for navigation but also for blind flying and the like.

In the accompanying drawings, which form part of the instant specification and which are to be read in conjunction therewith, and in which like numerals are used to indicate like parts in the various views:

Fig. 1 is a diagrammatic perspective view of a master gyroscopic system showing one embodiment of our invention.

Fig. 2 is a top plan view of a gyroscopic system which is diagrammatically illustrated in Fig. 1.

Fig. 3 is a view of the upper portion of the system shown in Fig. 2, but drawn on an enlarged scale.

Fig. 4 is a sectional view drawn on an enlarged scale taken along the line 4—4 of Fig. 2.

Fig. 5 is a fragmentary sectional view taken on the line 5—5 of Fig. 4.

Fig. 6 is a fragmentary sectional view taken on the line 6—6 of Fig. 4.

Fig. 7 is a sectional view drawn on an enlarged scale taken on the line 7—7 of Fig. 2.

Fig. 8 is a sectional view taken on the line 8—8 of Fig. 7 drawn on an enlarged scale.

Fig. 9 is a sectional view taken on the line 9—9 of Fig. 7.

Fig. 13 is a sectional view taken on the line 13—13 of Fig. 3.

Fig. 14 is a sectional view taken on the line 14—14 of Fig. 13.

Fig. 15 is a sectional view on an enlarged scale taken along the line 15—15 of Fig. 13.

Fig. 16 is a sectional view taken along the line 16—16 of Fig. 3.

Fig. 17 is a sectional view taken along the line 17—17 of Fig. 16.

Fig. 18 is a detailed sectional view with parts broken away, taken along the line 18—18 of Fig. 4.

Fig. 19 is a diagrammatic view showing the electrical connections used in our system.

Figure 10:
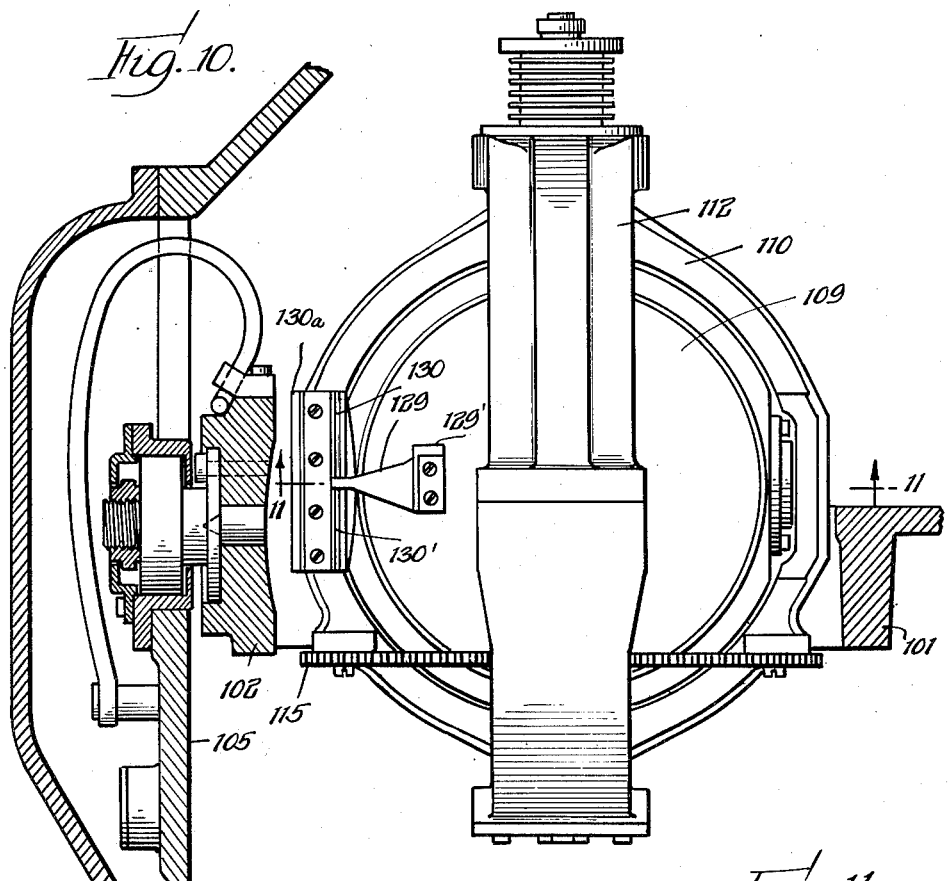
Fig. 10 is a sectional view drawn on an enlarged scale taken on the line 10—10 of Fig. 2.

Referring now to the drawings, and particularly Fig. 1, the stabilized platform 1 is mounted on a Cardanic suspension. A gimbal ring 2 is pivotally mounted for rotation about a longitudinal or roll axis by means of fore and aft shafts 3 journaled in bearings 4 rigidly carried by members 5 which are immovably secured in any desired manner to the airplane or vessel supporting our gyroscopic system. The supports 5 are shown to be perpendicular, but it is to be understood their direction is immaterial. They may be suspended from an overhead point or extend laterally. The gimbal ring 2 is free to turn 360 degrees in the bearings 4. Bearings 6 extend transversely of the gimbal ring 2 along a line perpendicular to the longitudinal or roll axis of the craft on which our gyroscopic system is mounted. Shafts 7 are journaled in the bearings 6 and permit the stable platform 1 to rotate through 360 degrees. Three gyroscopes are mounted on the platform 1. The gyroscope wheel 8 is mounted to spin about an axis which is parallel to the platform 1. For purposes of convenience, each of the gyroscopes will be described by reference to its spin axis, that is, the axis of rotation of the gyroscope wheel; its control axis, that is, the axis around which the gyroscope exercises control, and the tilt axis, which is the axis perpendicular both to the spin axis and the control axis. In the case of the gyroscope 8, the spin axis is horizontal. The control axis is normal to the stable platform 1, and the tilt axis extends at right angles to the control axis and the spin axis, and is also parallel to the plane of the stable platform 1. The ring 9 represents the housing of the gyroscope 8. It is pivotally mounted about the tilt axis in a Cardan ring 10. A shaft 11 is pivotally mounted in a framework 12 which is part of the stable platform 1. The shaft is rigid with the ring 10, which turns therewith in upper bearing 13 and lower bearing 14 mounted on the framework 12. Secured to the shaft 11 for rotation therewith is a gear wheel 15 which meshes with a pinion 16 which is secured to a shaft 17 for rotation therewith. The shaft 17 is adapted to be driven by a servomotor 18. A gear wheel 19 is keyed to the shaft 11 and rotates therewith. The gear 19 meshes with a pinion 20 mounted to rotate shaft 21 of the synchronous transmitter 22. The pinion 20 is meshed with a gear wheel 23 adapted to rotate shaft 24 of the synchronous transmitter 25. The Cardan ring 10 carries a member 26 made of Swedish iron adapted to be influenced magnetically by either pole 27 or pole 28 of a pair of electromagnets to precess the gyroscope, as will be hereinafter more fully pointed out. The gyroscope housing 9 carries a wiper 29 adapted to contact conducting segments 30 mounted on the Cardan ring 10. The segments 30 are separated by suitable insulation. The contact of the wiper 29 with the upper segment 30 is adapted to rotate the servomotor 18 in one direction, while contact of the wiping element 29 with a lower segment 30 is adapted to rotate the servomotor 18 in the opposite direction, as will be hereinafter more fully pointed out.

A gyroscope 31 is adapted to rotate about an axis normal to the platform 1 in a housing represented by the ring 32. The housing 32 is pivoted to rotate in bearings carried by the stable platform 1 around an axis which extends fore and aft of the craft. The axis is represented by the shaft 33 which is rigid with the housing 32 and is adapted to rotate therewith. The shaft 33 carries an iron member 34 secured to the shaft 33 for rotation therewith, which iron member is adapted to be influenced alternately by the poles 35 and 36 of electromagnets to precess the gyroscope 31. The gyroscope 31 is adapted to control the stable platform around the pitch or lateral axis. The axis 33 is at right angles to the shaft 37, which is in the direction of the spin axis, and at right angles to the transverse axis of the vessel and is therefore the tilt axis of the pitch gyroscope wheel 31. Parallel to the control axis of the pitch gyroscope we mount a bail 38 for pivotal movement about a line parallel to the pitch axis. The bail 38 is really an inverted pendulum. Its upper end is formed with a slot 39 in which the axle 37 is adapted to rotate. Tilting of the bail will cause movement between a side of the slot 39 and the axle 37 and will create a torque about the tilt axis 33. Secured to the bail 38 is a member 40 adapted to co-act with a locking pin 41 which is actuated by an electromagnet 42. The locking pin 41, together with member 40, is adapted to immobolize the bail 38. A pair of conducting segments 43 and 44, similar to the two segments 30 of the azimuth gyroscope assembly, is mounted on an insulating member 45 carried by the stabilized platform. A conducting arm or wiper 46 is adapted to make contact with either segment 44 or segment 43 upon rotation of the gyro-housing about the tilt axis 33. Contact between the wiper 46 and the segment 44 is adapted to rotate the servomotor 47 in one direction, while contact of the wiper 46 with the segment 43 is adapted to rotate the servomotor 47 in the opposite direction. The servomotor shaft 48 carries a gear wheel 49 which meshes with a gear wheel 50. The gear wheel 50 is rigidly secured to the bearing 6 carried by the gimbal ring 2. The construction is such that rotation of the gear wheel 49 in a clockwise direction will rotate the stabilized platform 1 around the lateral or pitch axis in a clockwise direction as viewed from the left or port.

A gyroscope 51 is mounted on an axle 52 likewise normal to the stable platform 1 and parallel to the axle 37. The housing of the gyroscope wheel 51 is represented by the ring 53 and is mounted to rotate around an axis lying in a vertical plane parallel to the lateral or pitch axis of the craft. It will be noted that this direction is at right angles to the direction around which the housing 32 of the pitch gyroscope is mounted. The axis of rotation of the gyrohousing 53 is represented by the shaft 54 which is rigidly secured to the housing 53 and adapted to rotate therewith in suitable bearings carried by the stable platform 1. The shaft 54 carries for rotation therewith a member 55 made of soft iron or any other suitable ferrous material adapted to be influenced alternately by the pole 56 of an electromagnet or the pole 57 of another electromagnet to precess the gyroscope. The gyroscope 51 controls the stabilization of the platform 1 caused by rotation around the longitudinal or roll axis and will be referred to for purposes of convenience as the roll gyroscope. The control axis of the roll gyroscope 51 extends fore and aft parallel to the vertical plane including shafts 57 and 58, around which we pivot a bail 59. The bail 59 is formed with a slot 60 in which the axle 52 of the gyroscope 51 is lodged. Actually, the speed of rotation of the gyroscope wheels 31 and 51 is too great for ready use in our erecting system so that what is shown in the diagrammatic view 1 to be a portion of the axles 37 and 52 in the slots 39 and 60 are in actual practice members driven by the gyroscope wheels in the same direction of rotation as the gyroscope wheels, as will be hereinafter more fully pointed out. Tilting of the bail, which is really an inverted pendulum, lodges one side or the other of slot 60 against the rotating axle 52 and creates a torque around the tilting axis of the gyroscope, causing precession to the vertical, as will be hereinafter more fully pointed out. Actually, the axles 37 and 52 are always parallel and always point toward the zenith. The platform 1 is always parallel to the true horizon, whatever may be the location of the craft carrying our stabilized gyroscopic system with respect to the earth. The gyroscope housing 53 carries a contact arm or wiper 61 adapted to make contact alternately with a pair of segments 62 and 63 mounted upon an insulating member 64'. Contact of the wiper arm 61 with segment 63 is adapted to rotate the servomotor 64 in one direction, while contact of the wiper 61 with the segment 62 is adapted to rotate the servomotor 64 in the opposite direction. The servomotor 64 is provided with a shaft 65 to which is keyed a pinion 66, meshing with a gear 67. The gear 67 is rigidly mounted on the bearing 4 so that rotation of the gear 66 in a clockwise direction will rotate the gimbal ring 2 in a clockwise direction and hence the stabilized platform 1 in a clockwise direction, viewed from aft. A gear 68 is carried by the gimbal ring 2 and meshes with a pinion 69, which is mounted for rotation with a shaft 70. The shaft 70 is adapted to operate the rotor of a synchronous transmitter 71 carried by the member 5. A gear 72 is rigidly mounted on the gimbal ring 2 and meshes with a pinion 73 carried by a shaft 74 of a synchronous transmitter 75 which is mounted in a bracket 76 carried by the stabilized platform. Rotation of the stabilized platform around a fore and aft or roll axis will be reflected by the rotation of the rotor of the synchronous transmitter 71. Rotation of the stabilized platform 1 around the transverse or pitch axis will be reflected by the rotation of the rotor of the synchronous transmitter 75. The bail 59 of the roll gyroscope 51 carries a member 76 adapted to coact with a locking pin 77 actuated by an electromagnet 78. Upon energization of the electromagnet 78 the pin 77 will seat in the member 76 to immobilize the bail 59.

Referring now to Fig. 2, the stabilized platform is shown as a framework 101, which is mounted for rotation about the pitch axis in suitable bearings carried in the gimbal ring 102. The gimbal ring 102 is mounted for rotation around a fore and aft axis in bearings carried by a member 105, which member is rigidly carried in any suitable manner by the craft supporting our master gyroscopic system. The azimuth gyroscope housing 109 carries a wiper 129 adapted to contact segments 130 carried by the Cardan 110. The frame 112 carries a suitable bearing 113 in which the shaft 111 is adapted to rotate. The Cardan 110 carries a gear 115 adapted to be driven by a servomotor indicated generally by the reference numeral 118. The housing 132 of the pitch gyroscope is mounted in bearings for rotation about an axis normally parallel to a vertical plane including the longitudinal axis of the craft. It carries a wiper blade 146 adapted to contact segments 143 and 144 carried by the insulating member 145. A core of soft iron 134 is positioned for influence by either of solenoids 136 or 137. The bail 138 carries a member 140 adapted to lock the bail in association with locking pin 141, actuated by electromagnet 142. The roll gyroscope is mounted to rotate in a housing 153, which is pivoted for rotation in suitable bearings around an axis normally perpendicular to a vertical plane including the roll or fore and aft axis of the craft. The housing carries a wiper 161 adapted to make contact with segments 162 or 163 carried by an insulating member 164 suitably supported by the stabilized platform 101. Secured to the roll gyroscope housing 153 is a bracket carrying a member 155 of ferrous material adapted to be influenced by solenoids 157 and 156 to tilt the gyroscope housing, as will be hereinafter more fully described. The bail 159 is pivoted about a fore and aft axis and carries a member 176 adapted to co-act with a locking pin 177 when influenced by the electromagnet 178. A gear wheel 172 is secured to the gimbal 102 and rotates therewith. The gear 172 meshes with the gear 173, which drives the rotor of the synchronous transmitter 175. The servomotor, indicated generally by the reference numeral 147, is adapted to rotate pinions which mesh with the gear 150, which is carried rigidly secured to the gimbal 102, as will be hereinafter more fully described. A gear 167 is carried by the supporting framework 105 and corresponds to the gear 67 shown in Fig. 1. The servomotor and the synchronous transmitter associated with the mechanism for rotating it about the fore and aft axis and for transmitting relative rotation around the longitudinal axis, is omitted for purposes of clarity. The servomotor, however, is of the same general construction as the servomotors which will be described in connection with rotation around the azimuth axis and for rotation about the pitch axis.

Referring now to Fig. 4, the gimbal ring 102 supports the stabilized platform 101 for rotation about a transverse axis. The bearings for the gyro-housings for the pitch and roll gyroscopes are shown in Fig. 4. They comprise a member having a squared end 180 suitably clamped on the stabilized platform 101 and carrying a ball bearing 181, around which the gyro-housing is adapted to pivot. Referring now to the pitch gyroscope in Fig. 4, there is secured to the gyro-housing 132 by suitable screws 182, a sleeve 183 of any suitable material. Secured to the sleeve are pole pieces 184 and 185, which carry windings 186 and 187. The gyroscope wheel 131 is secured to the shaft 188. The armature winding 189 of the motor rotates between the pole pieces 184 and 185. The armature of the gyroscope is provided with a commutator 190 against which suitable brushes 191 contact. It will be noted that the motor shaft rotates in suitable ball bearings. Referring now to the roll gyroscope, there is a similar sleeve 183' adapted to support pole pieces 185' and field windings 187'. The armature 189' is provided with a commutator 190', against which suitable brushes 191' and 192 contact to supply the armature current. The upper ends of the motor shafts of both the roll and pitch gyroscopes are provided with a cap member 193. The cap member 193 engages a friction disk 194. The friction disk is secured to a shaft 195 against the upper end of which a spring clip 196 acts. The spring pressure insures proper frictional contact between the friction disk 194 and the cap member 193. Secured to the shaft 195 for rotation therewith is a gear sleeve 197 which meshes with a gear 198 rotatably mounted on a stub shaft 199. A cork sleeve 200 is integrally carried by and rotates with the gear 198 and is adapted to contact the slot formed in the bail 159. For purposes of convenience, the reference numerals on the transmissions for both the roll and pitch gyroscopes are the same, since the structures are identical. It will be observed that the transmission just described is such that the sleeves 200 of both the roll and pitch gyroscopes will rotate in the same directions as the gyroscope wheels. For example, suppose the roll gyroscope were rotating in a clockwise direction, as viewed in Fig. 4 from above. The friction disk 194 would rotate in a counter-clockwise direction. The sleeve gear 197 would likewise rotate in a counter-clockwise direction, rotating the gear 198 in a clockwise direction, and hence the shaft 199 and the bushing 200 in a clockwise direction, which was the direction of rotation assumed for the gyroscope wheel 151. The same relationship will hold true for the pitch gyroscope, so that the simplified arrangement shown in Fig. 1 holds true. The effect of the transmission, however, is to greatly reduce the speed at which the cork sleeves rotate and thereby increases the life of the cork friction sleeves and minimizes the adverse effects of any run-out or unbalance of the cork sleeves and gears 198. The bails 138 and 159 are pivotally mounted so as to act as inverted pendulums. By reference to Figs. 4 and 18, it will be observed that the lower end of the bails are forked and are mounted about suitable ball bearings 154, suitably supported from the stable platform 101. A pivoted member 141a is adapted to carry the bail locking pin 141. A spring 141b normally urges the bail locking support member 141a upwardly against a stop 141c. The action of the bail locking solenoid 142 is to move the bail locking member 141a downwardly against the action of the spring 141b. In Fig. 4, the gear 150 supported by the gimbal ring 102, and the gear 172 supported by the gimbal 102, are clearly shown.

Referring now to Fig. 3, there is shown the upper portion of Fig. 2 on an enlarged scale. The reference numerals used in Fig. 3 correspond to those used in Fig. 2 and are one hundred more than those used for corresponding parts in Fig. 1. The gimbal 102 carries the stabilized platform 101. The azimuth gyroscope housing 109 is pivoted to rotate about a horizontal axis in the Cardan ring 110. The wiper element 129 makes the contact with the segments 130. The large gear 115 is carried by the Cardan ring 110. The azimuth gyroscope servomotor is indicated generally by the reference numeral 118 and it will be more fully described hereinafter. Meshing with the gear 115 is the gear 119, which drives a pinion 120, which rotates the rotor of the synchronous transmitter 122. The gear 119 carries a smaller gear 119c which meshes with a gear 123, which rotates the shaft 124 of the synchronous transmitter 125. The gear 172 is carried by the gimbal ring 102, which meshes with the gear 173 carried by the shaft 174, to which is secured the rotor of a synchronous transmitter 175 adapted to transmit rotation about the lateral or pitch axis. The servomotor for applying torques to the stable platform around the pitch axis is indicated generally by the reference numeral 147 and acts through the gear 150 which is carried by the gimbal ring 102. This servomotor will be more fully described hereinafter.

Referring now to Fig. 7, the frame 112, which is part of the stable platform, has an upper bearing 113 and a lower bearing 114, in which bearings the Cardan ring 110 is pivoted. The gyroscope housing 109 is adapted to rotate about a horizontal axis in bearings carried by the Cardan ring 110. The lower end of the Cardan ring 110 carries an iron member 126 adapted to be acted upon by electromagnets 127 and 128 to precess the azimuth gyroscope. The large gear 115 carried by the Cardan ring 110 meshes with the gear 119 and drives the gearing described with reference to Fig. 3 to drive the synchronous transmitters 122 and 125.

In Fig. 8 the bearing 113 is shown in detail. A plurality of copper rings 103 are shown, through which the electrical connections are made. The wiring may pass downwardly through the tube 171. This is merely a detail of construction in one embodiment of our invention.

Figure 12:
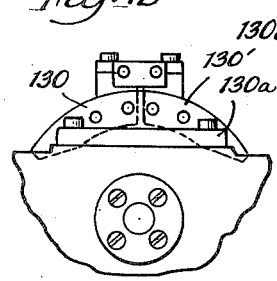
Fig. 12 is a fragmentary side elevation taken on the line 12—12 of Fig. 11.
Figure 11:
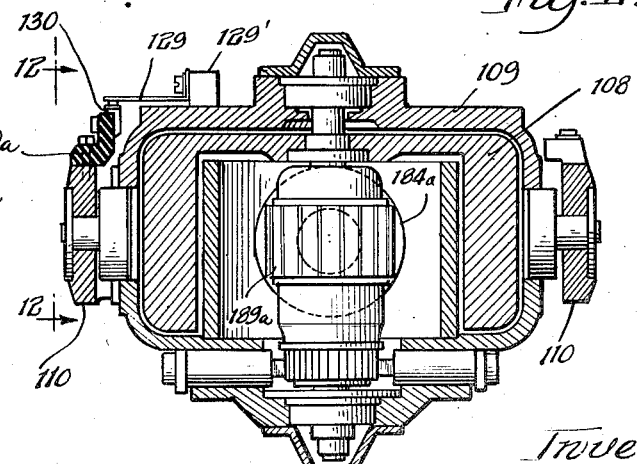
Fig. 11 is a sectional view taken on the line 11—11 of Fig. 10.

Further details of the azimuth gyroscope construction are shown in Figs. 10, 11, and 12. It will be noted that the method of spinning the azimuth gyroscope wheel 108 in the azimuth gyro-housing 109 is similar to that described in connection with the roll and pitch gyroscopes. The gyro-housing, however, is pivoted in the Cardan ring 110 instead of on the stable platform directly. The wiper arm 129 is carried by an insulating block 129' mounted on the gyro-housing 109. The conducting segments 130 and 130' are mounted on an insulating block 130a, carried by the Cardan ring 110.

Referring now to Figs. 3 and 13 to 17 inclusive, the servomotor construction can be readily seen. The armature shaft of a motor 300 carries a pinion 301 which meshes with a gear 302, secured to a shaft 303, to which is in turn secured a bevel gear 304. The bevel gear 304 meshes with a bevel gear 305 secured to a shaft 306, which carries a pinion 307 for rotation therewith. The pinion 307 meshes with a gear 308 which in turn meshes with a gear 309. The gears 308 and 309, it will be observed, will therefore rotate in opposite directions. Referring now to Fig. 15, the gear 309 is pressed on and rotates with a bushing 310, which is journaled around the end 311 of shaft 314. The bushing 310 has axial play along the shaft 311 and is normally held to the right by the action of a spring spider 312. A clutch plate 313 is secured to a shaft 314 rotating in a bearing 315. The end of the shaft has secured thereto a pinion 316 which meshes with the gear 150 which is carried by the gimbal ring 102. The clutch plate 313 is normally unclutched from the gear 309, and is faced with a cork ring 317. An electromagnet or solenoid 318 is adapted to attract an armature 319 normally held in the position shown in Fig. 15 through the action of a spring 320. When the winding of the solenoid 318 is energized, the armature 319 will be attracted, forcing it to pivot about pivot pin 321 to cam the bushing 310 to the left, as viewed in Fig. 15, against the action of the spring spider arms 312. This brings the rotating gear 309 into engagement with the clutch plate 313 and applies a torque tending to rotate the shaft 314 to which the clutch plate 313 is secured. This torque is transmitted by the shaft 314 to the pinion 316. Since the pinion 316 is mounted upon the stable platform 101, the torque applied to pinion 316 is transmitted to the stable platform through reaction upon gear 150 secured to the gimbal ring 102. This is diagrammatically shown in Fig. 1 as the interaction between gear 49 and gear 50.

The gear 308 shown in Fig. 13 is adapted to apply a torque to a pinion 322 which in turn applies a torque to the stable platform in the opposite direction.

The gear 302 shown in Figs. 3, 13 and 16, meshes with a gear 323, which is adapted to rotate a shaft 324 to which is secured a pinion 325. The pinion 325 meshes with a gear 326, which is in turn meshed with another gear 327. The gears 326 and 327 are similar to the gears 308 and 309. They are adapted to be alternately clutched to pinions 328 and 329, which are in mesh with the ring gear 115, which is carried by the Cardan ring 110 of the azimuth gyroscope. A solenoid 330 is adapted to control the clutching of the gear 326 to the pinion 328. A solenoid 331 is adapted to control the clutching of the pinion 329 to the gear 327. Fig. 17 shows the solenoid arrangement which is similar to that described with respect to Fig. 15. The armature 332 is normally held in non-actuating position by the action of a spring 333. The armature is pivoted about a pivot pin 334 so that upon energization of the winding of the electromagnet 331, the armature 332 will rotate in a clockwise direction to clutch gear 327 to the clutch plate 335 to rotate pinion 329 and thus apply a torque to the ring gear 115. This torque produces precession of the azimuth gyroscope about its tilt bearings until the wiper 129 is returned to the mica neutral 130.

The servomotor system shown in Figs. 13 and 15 is controlled by the wiper arm 146. A similar servomotor system adapted to act through gear 167 to apply a torque to the gimbal ring 102 about the longitudinal axis is controlled by the wiper arm 161, shown in Figs. 2 and 6.

The electrical connections are shown in Fig. 19, which will be described hereinafter.

The operation of our device can be best understood by reference to the diagrammatic view shown in Fig. 1. It will be assumed the gyroscope wheels 31 and 51 are spinning in a clockwise direction, viewed from above. It will be assumed that in the figure the two gyroscope wheels 31 and 51 are on the after or rearward part of the stable platform 1 and that the azimuth gyroscope wheel 8 is mounted on the forward part of the platform 1. The transverse or pitch axis extends from port to starboard, that is, from left to right. The servomotor 47 is mounted on the port side of the platform. The servomotor 64 is mounted on the after part of the gimbal ring 2. It will be further assumed that the gyroscope wheel 8 is revolving in a clockwise direction, as viewed from port. These directions must be kept in mind if the correct sequence of motions, which will be described in connection with the operation of our instrument, is to be understood. It is to be understood further that either direction of rotation for each of the gyroscope wheels may be chosen, as the directions of rotation of the gyroscopes do not affect the theory of operation. Let us assume that the gyroscope wheels are all spinning in the direction just pointed out and that the spin axes of the gyroscope wheels 31 and 51 are vertical and aligned with gravity, that is, pointing toward the center of the earth. Let us assume further that the platform 1 is stabilized so that it is normal to the direction of the spin axes of the gyroscopes 31 and 51. Let us further suppose that the instrument is mounted in an aircraft which is flying directly north from the south. Let the airplane now make a left climbing turn, and let us consider the effect of this first upon the mechanism which exercises control around the longitudinal axis of control. Since the plane must bank port side downwardly in making a left turn, the port side of the platform 1, due to the friction of the fore and aft bearings of the gimbal ring 2, will tend to move downwardly along with the port side of the airplane. In other words, there will be a tendency for the stabilized platform 1 to rotate in a counter-clockwise direction around the fore and aft axis. When this occurs, a torque will be applied to the roll gyroscope wheel 51 in a counter-clockwise direction around its control axis, that is, around a fore and aft axis. This will cause the top of the gyroscope axle 52 to precess forwardly, thus moving the wiper 61 off the neutral point of the segment 64' onto the conducting segment 62. This will complete a circuit which tends to rotate the servomotor pinion 66 in a clockwise direction, thus applying a torque to the gimbal ring 2 in a clockwise direction and through bearing 7 to the stable platform and thence to the roll gyroscope wheel. This torque is of sufficient magnitude to overcome the original disturbing counter-clockwise torque produced when the port wing went down, and also to precess the top of axle 52 of the gyroscope wheel 51 rearwardly, bringing the wiper arm 61 back to neutral position.

In climbing, the plane nose will move upwardly and the after end of the plane will move downwardly, that is, there will be a rotation around the lateral or pitch axis. Due to the friction of the bearings and the friction in connection with driving the synchronous transmitter rotor, the after end of stable platform 1 will tend to move downwardly along with the after end of the airplane. When this occurs, a clockwise torque is exercised around the control axis of the gyroscope 31. This clockwise torque will precess the top of the axle 37 to port, thus carrying the wiper 46 off of its neutral point on the insulating block 46 and on to the conducting segment 44. This will energize the servomotor to produce a counter-clockwise rotation of the pinion 49, thus rotating the stable platform 1 in a counter-clockwise direction. The counter-clockwise rotation of the platform 1 will cause the top of the axle 37 to precess to starboard, thus carrying the wiper 46 back to the neutral point when the platform 1 has reached a position normal to gravity around a transverse axis. It will be seen that during the turn, the platform is maintained in a horizontal position, both with respect to rotation around the pitch axis and the roll axis. As the plane turns to the left, a counter-clockwise torque, viewed from above, is applied to the gyroscope 8 about its vertical or control axis. This torque arises from the friction of the parts and the connections to the synchronous transmitters, which are connected to the gear 19. The counter-clockwise torque about the vertical axis will precess the port side of the gyroscope housing downwardly, the rotation of the housing being about a fore and aft axis in a counter-clockwise direction, viewed from astern, thus carrying the wiper blade downwardly and onto conducting segment 30'. This energizes the correct solenoid to rotate the servomotor 18 in a counter-clockwise direction, as viewed from above, thus rotating shaft 17 and gear 16 in a counter-clockwise direction. This will rotate gear 15 in a clockwise direction, thus precessing the gyroscope 8 in a clockwise direction, viewed from aft around a fore and aft axis, and raising the port side of the housing and hence the wiper blade 29, bringing the wiper blade to neutral position when the cardan 10 again is aligned with the original plane of orientation around the vertical axis.

Let us now assume as before that the ship is headed north in straight, level flight. The earth is rotating from west to east at a speed of nine hundred nautical miles per hour. Since the spin axis of the roll gyroscope 51 tends to remain stationary in space, this motion of the earth, the plane being carried along with the earth through the forces of gravitation, will cause the bail 59 in effect to tilt to port, that is, the gravity of the earth will exercise pull upon the inverted pendulum and since the spin axis is inclined to port, the weight of the bail slot upon the upper portion of the rotating axle will cause a counter-clockwise torque around the tilt axis, that is, the transverse axis of the gyroscope 51, it being remembered that the gyroscope is rotating in a clockwise direction, as viewed from above. This causes the top of the roll gyroscope axle 52 to precess to starboard, thus rotating the gimbal ring 2 in a clockwise direction. This carries the wiper 46 of the pitch gyroscope to port, contacting the segment 44 and energizing the servomotor 47 to rotate the gear 49 in a counter-clockwise direction. This counter-clockwise rotation of the gear 9 will rotate the stabilized platform in a counter-clockwise direction, thus precessing the pitch gyroscope to starboard, along with and parallel to the precession of the top of the roll gyroscope axle 52 to starboard. The precession of the top of the roll gyroscope axle 52 to starboard realigns the bail 59 with the pull of gravity.

The precession of the top of the roll gyroscope to starboard with the consequent rotation of the stabilized platform in a clockwise direction will produce a clockwise torque around the tilt axis of the pitch gyroscope 31. This clockwise torque around the tilt axis of the pitch gyroscope will precess the top 37 of the pitch gyroscope axle aft, thus tilting the bail 38 aft. Since the pitch gyroscope is rotating in a clockwise direction, this will produce a counter-clockwise torque around the tilt axis of the pitch gyroscope and again precess it forwardly, cancelling the effect of the aft precession of the top of the pitch gyroscope due to the clockwise rotation of the stable platform.

It will be seen that the effect of the rotation of the earth is automatically compensated for by the bail 59 when the ship is headed on north course. When the ship is headed on an east and west course, the bail 38 will compensate for the rotation of the earth. If the ship is headed toward the east, the speed of the plane accelerates the action just described. If the ship is headed on a westerly course, the action just described is minimized by the difference between the speed of the airplane and the speed of the rotation of the earth. At intermediate courses, both bails are affected, each taking care of the components along the respective control axes of the pitch and roll gyroscopes.

Let us now observe the effect of the speed of the airplane in a northerly direction as it has an effect upon the change in latitude. As the ship heads north, the speed of travel tends to bring the upper end of the axle 37 of the pitch gyroscope to a position inclined rearwardly with respect to the vertical. The effect of this is to tilt the bail 38 aft, thus bringing the upper side of the slot 39 in the bail 38 in contact with the rotating axle 37. Since the axle is rotating in a clockwise direction, viewed from above, a counter-clockwise torque will be produced around the tilt axis, that is, the fore and aft axis of the pitch gyroscope. This will cause the top of the axle 37 of the pitch gyroscope to precess forward, thus rotating the stable platform in a counter-clockwise direction around the pitch or transverse axis. This will bring the wiper arm 61 rearwardly with respect to segment 64' and make contact with the rear segment 63. This will rotate the gear 66 in a counter-clockwise direction, thus rotating the gimbal ring 2 and the stable platform in a counter-clockwise direction. A counter-clockwise direction of rotation of the stable platform will precess the top of the roll gyroscope 31 forwardly, aligning it with the axis of the pitch gyroscope, which was precessed forwardly by the counter-clockwise torque applied by the tilting of the bail 38.

As the top of the pitch gyroscope precesses forwardly, it rotates the stable platform in a counter-clockwise direction around the pitch axis. This causes the top of the roll gyroscope to precess to starboard. This precession, however, will tilt the bail of the roll gyroscope to starboard and create a clockwise torque around the tilt axis, that is, the transverse axis of the gyroscope 51. This clockwise torque will precess the top of the roll gyroscope to port, bringing it again to a position normal to the stable platform, which is being maintained normal to a line passing through the center of the earth.

It will be seen from the foregoing that the stable platform is always kept in the plane of the horizon and that the azimuth gyroscope will be oriented to its originally set plane. Let us suppose that we wish to change the orientation of the azimuth gyroscope. This is done by energizing the electromagnet wound around pole 28, attracting the armature 26, which is carried by a shaft rigidly connected to the gyroscope housing 9. This creates a clockwise torque about the tilt axis of the gyroscope 8, that is, a torque tending to rotate the housing 9 in a clockwise direction around a fore and aft axis, viewed from aft. Since the gyroscope wheel 8 is rotating in a clockwise direction, as viewed from port, the port side of the housing 9 and the axle will move in a rearward direction, that is to say, the gyroscope will precess to rotate the cardan 10 in a counter-clockwise direction, as viewed from above.

An airplane is a very mobile vehicle and can change course, attitude, and speed very rapidly. The accelerations and decelerations of the plane are frequently great enough to affect the bails 38 and 59 adversely and introduce errors. Accordingly, we have provided means sensitive to acceleration and deceleration along both the pitch and roll axes, to lock the bails and to cause precession in accordance with the components of the course and speed, both in latitude and in longitude, and to compensate by precession for the rotation of the earth, by means of a computer and electromagnetic precession means.

The operation of the precession mechanism can best be understood by reference to Figs. 1 and 19. It will be seen by reference to Fig. 1 that the bail 59 produces torque around the tilt axis of the roll gyroscope 51, that is, around a transverse axis. The member 55 adapted to be influenced magnetically by either pole 57 or 56 produces torque similar to the torque produced by tilting of the bail 59. Similarly, the iron member 34 adapted to be influenced by either pole 36 or 35 produces a torque around the tilt axis of the pitch gyroscope 31, that is, around an axis extending in the fore and aft direction. This torque is similar to the torque produced by the tilting of the bail 38.

Referring now to Fig. 19, which is a schematic view showing the electrical connections of our instrument, the armature motor 189a of the azimuth gyroscope motor is provided with a field winding 184a. A suitable battery B supplies current for the motor. The azimuth gyroscope housing 109 carries a wiper blade 129 adapted to make contact alternately with conducting segment 130 or conducting segment 130'. When the wiper 129 is in contact with segment 130, current will flow from the battery through conductor 400, through the wiper blade 129, through segment 130, through conductor 401, through the winding 331 of control electromagnet, thence to ground 402 and back to the other side of the battery B, through ground 403. The energization of the winding 331 will operate the clutch 335 so that pinion 329, which is in mesh with gear 115, will apply a torque to gear 115 in a counterclockwise direction, as viewed from above. The contact of wiper blade 129 with segment 130' will cause current to flow from the battery B, through conductor 400, through segment 130', through conductor 404, through the winding of solenoid 330, to ground 405, thence to the other side of the battery through ground 403. The energization of the winding 330 will operate the clutch 332 to clutch pinion 328 with gear 326 to drive the gear 115 in a clockwise direction as viewed from above. It will be seen that the pinion 325 is driving gear 327 in one direction, while gear 326 rotates in the opposite direction, being meshed with gear 327. The pinion 325 is driven by the motor armature 300, to which current is supplied through conductors 406 and 407. To the shaft 303 there is secured a bevel gear 304 which meshes with a bevel gear 305 to drive a shaft 306. The shaft 306 carries a pinion 307 which drives gear 308 in one direction. Gear 308 meshes with gear 309 and is driven in the opposite direction. Electromagnet 324 when energized is adapted to clutch the pinion 322 into driving engagement with the gear 308. The electromagnet 318 when energized is adapted to clutch a pinion 316 into driving engagement with the gear 309. Pinions 322 and 316 are in engagement with the gear 150.

The pitch gyroscope armature 189 is energized by current flowing from the battery through conductors 407 and 408, which also supply current to the field winding 187. The housing of the pitch gyroscope is represented by the member 132 and carries a wiper blade 146 adapted to make contact with conducting segments 144 and 143. Current flows from the conductor 407, through the conductor 409, to the wiping arm 146, and thence through either segment 144 and conductor 410 or through segment 145 and conductor 411, to energize either winding 324 or winding 318, to actuate the clutching of pinions 322 and 316 to gears 308 or 309. The armature 189' of the roll gyroscope is supplied current through conductor 407 and conductor 412 which also supplies the current for the field winding 187'. The housing 153 of the roll gyroscope carries a wiper arm 161 adapted to make contact with either of conducting segments 162 or 163. When contact is made with conducting segment 162, current will flow from the conductor 407, through the conductor 413, through segment 162, through conductor 414, through the winding 415 of the servomotor controlling the application of torque to the stable platform around a fore and aft axis. When the wiper 161 is in contact with conducting segment 163, current will flow through conductor 416, through the winding 417 of the electromagnet controlling the opposite clutch of the servomotor indicated generally by the reference numeral 64 in Figs. 1 and 19. The servomotor is of the same general construction as the ones heretofore described in connection with the azimuth and pitch gyroscopes. A motor armature 418 drives a pinion 419, which is meshed with a gear 420, which is in turn meshed with another gear 421, so that the gears 420 and 421 rotate in opposite directions. Clutch members 422 and 423 are adapted to be operated by the electromagnets 417 and 415 to clutch pinions 425 and 424 alternately to the gear 167, which is carried by the support 105. Rotation of the pinions 424 and 425 will rotate the gimbal ring 102 around a fore and aft axis.

The bail locking magnet 142, which is adapted to lock the bail of the pitch gyroscope, is supplied with electrical potential from the battery through conductor 406 and conductor 426. Normally current will not flow through the bail locking magnet since the circuit through conductor 427 to ground 435 is interrupted. The magnetic precession solenoids 136 and 137 are supplied potential from the computer 428. The computer is an instrument, which is not part of the present invention, into which the course of the craft is set by knob 429 and appears at window 430. If desired, the course may be set automatically from a synchronous repeater. The speed of the craft is set by knob 431 and appears at window 432. This likewise can be set automatically from a synchronous repeater actuated from a speed meter. The latitude is set by a knob 433 and appears at window 434. This likewise can be set automatically by means of a synchronous transmitter. It will be observed that the synchronous repeaters operated by our stable platform will always keep the platform normal to a line drawn through the center of the earth around both the pitch and roll axes. Our azimuth gyroscope will always indicate any desired direction and also operate synchronous transmitters. The synchronous transmitters along the three axes can be used to operate synchronous repeaters to control servomotors and stabilize a second platform exactly in accordance with the stabilization of our master platform. In addition, the stabilized platform can be suspended in a Cardanic suspension and oriented always to the north. The platform then will always indicate the true horizon, that is, it will be parallel to the plane of the true horizon, no matter where the craft happens to be on the earth. We can orient the second stabilized platform always to the north by setting the Cardan ring of the azimuth gyroscope initially in a northerly plane, and it will always maintain a northerly direction. On the oriented stabilized repeater platform, we can mount a gyroscope similar to the azimuth gyroscope. Its spin axis, however, will be perpendicular to the stabilized platform when the airplane is at the Equator, and parallel to the stabilized platform when the airplane is over the pole. In other words, the Cardan ring of the gyroscope mounted on the second stabilized platform has its axis parallel to the axis of the earth through the North and South Poles. As the airplane moves about in space, the angle between the plane of the second stable platform and the Cardan ring will measure the angle of elevation of the pole above the horizon. Since the altitude of the elevated pole, that is, its angle above the horizon, is equal to latitude, the gyroscope mounted on the second stabilized platform will always measure latitude. A synchronous transmitter may operate a synchronous repeater to keep latitude set in the computer automatically. The computer generates a voltage which is a function of the speed of rotation of the earth. This is corrected by the component in an east or west direction of the speed of the craft and its direction of flight. The component in a north and south direction generated by the speed and course of the craft makes corrections in a latitude which is set in event the latitude gyroscope system is not used. Correct signals are produced and applied, not only to the precession solenoids 136 and 137 of the pitch gyroscope, but also to precession solenoids 156 and 157 of the roll gyroscope. The currents which flow when the circuits are completed through the precession solenoids produce effects equivalent to the effect described above of the bails 38 and 59. The potential applied, however, has no effect until circuits are completed through the precession solenoids.

An inverted pendulum 428 is mounted to pivot about a line parallel to pitch axis of the craft. The pendulum is connected to conductor 427 and is adapted to complete the circuit through bail locking electromagnet 142 and the precession sole- of contact points 436 or 450. Centering springs 433 normally hold the inverted pendulum out of contact with either of the contact points 450 or 436. A switch 451 through which the circuit of the precession magnets 136 and 137 is adapted to be completed is normally connected to the ground 452. In this way, the pitch gyroscope is precessed to compensate for the rotation of the earth and changes in latitude and components of speed, both in latitude and in longitude, by the output of the computer. This anticipates or duplicates the work normally done by the bail 38 of the pitch gyroscope. For this reason, if we operate with the computer always cut in, we may use a lighter bail since it will have to do less work than otherwise. Should the computer fail or if we desire, the switch 451 may be moved into contact point 453. In such case, the pitch bail will make the corrections, except in maneuvers which produce an undue fore and aft acceleration. In such cases, the circuit, both through the bail locking electromagnet 142 and the precession solenoids 136 and 137 will be completed through conductor 427, through the inverted pendulum 428, to ground 435. A similar inverted pendulum 429 is mounted along a fore and aft axis and is provided with centering springs 454. It is adapted to complete the circuit through bail locking electromagnet 178, through ground 438, upon undue acceleration or deceleration in a transverse direction. A switch 455, which is normally adapted to complete the circuits through precession solenoids 156 and 157, through ground 430, may be moved to make contact with contact point 466 so that both the bail locking electromagnet 178 and the precession solenoids 156 and 157 may have their circuits completed through the pendulum 429 and ground 438. The precession solenoids 156 and 157 make the same corrections which are made by the action of the bail 59 of the roll gyroscope. By always applying the correction, as is the case when switch 455 is grounded at 430, we may make the bail lighter than we otherwise could, thereby reducing the erection rate of the bail and improving accuracy of obtaining the vertical. Whenever the acceleration around the roll axis becomes great enough to overcome the effect of the centering springs 454, the bail locking electromagnet 178 is immediately energized, locking the bail and permitting the correction to be made only magnetically through the action of the computer 428 and the solenoids 156 and 157.

While we have described for purposes of illustration the use of inverted pendulums and centering springs for controlling the bail locking magnets, and if desired the precession magnets as well, it will be understood that any other suitable means responsive to acceleration, such as rate gyroscopes, may be employed. As soon as the acceleration or deceleration has ceased, that is, when a maneuver is completed, the bails 38 and 59 are unlocked and may again exercise control.

Current is supplied from conductor 407 to a motor 441, which drives alternator 442 and supplies single phase alternating current to the conductors 443 and 444. The synchronous transmitters comprise devices having bi-polar rotors and Y-wound stators. The single phase alternating current is supplied to the rotors. The synchronous repeaters are similar devices having their rotors connected in parallel with the rotors of the transmitters and the stators connected in parallel with the stators of the transmitters. The rotor 22 is the rotor of one of the azimuth synchronous transmitters. The rotor 25 is the rotor of the other azimuth synchronous transmitter. The gear 19 drives gears 20 and 23, as can be seen by reference to Figs. 1 and 19. Similarly, the gear 73 is driven from the gear 72 to rotate the rotor 75 of the pitch synchronous transmitter. The gear 68 rotates the gear 69, which drives the rotor 71 of the roll synchronous transmitter. The rotor 22a will follow the movements of the rotor 22. The rotor 25a will follow the movements of the rotor 25. The rotor 75a will follow the movements of the rotor 75, and the rotor 71a will follow the movements of the rotor 71. As many repeaters as may be desired may be operated from a single transmitter by connecting them in parallel with the transmitter. The transmitter rotor may be used to operate a follow-up system or relays to control servomotors which may be used to operate any desired instrumentality. For example, a synchronous repeater may be operated from the pitch gyroscope to keep the plane in level flight while the output of the azimuth repeaters may be used to control the rudder of the plane. The roll gyroscope repeater may be used to operate the ailerons. The synchronous transmitters may be used to stabilize a gun platform on a ship, which gun platform is always maintained parallel to the plane of the horizon. They may be used to operate fire control instruments or a bombsight.

It will be seen that we have accomplished the objects of our invention. We have provided a master gyroscopic system which will provide a stabilized platform upon which may be mounted an azimuth gyroscope for use in indicating true direction, and may therefore be used as a navigational compass and in connection with blind flying. We have provided a master gyroscope system which will provide a stabilized platform which is always oriented in the plane of the horizon, irrespective of deviations in course, speed, or attitude of the craft. We have provided a master gyroscope system which may be used to control an aircraft's automatic pilot, bombsight equipment, fire control apparatus, photographic survey equipment, and the like. We have provided a stabilized platform which will always be oriented in the plane of the horizon, irrespective of maneuvers of the plane and the acceleration and deceleration of the plane. We have provided a master gyroscopic system which will deliver considerable and usable torque about the various axes of control so that follow-up systems may be operated by the movement of the stable platform relative to the vessel. The azimuth gyroscope in our system is unaffected by bank turns, as has been the case in previous installations.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

Having thus described our invention, we claim:

1. A master gyroscope system, including in combination, a craft, a support, means for suspending said support for rotation relative to said craft about both a predetermined longitudinal axis and about a predetermined transverse axis, means preventing rotation of said support relative to said craft about a vertical axis, a first prime mover for applying torque to said support about said longitudinal axis, a second prime mover for applying torque to said support about said transverse axis, a first gyroscope having a vertical spin axis carried by said support for movement about a transverse axis, a second gyroscope having a vertical spin axis carried by said support for movement about a longitudinal axis, means responsive to relative movement between said first gyroscope and said support for controlling said first prime mover, and means responsive to relative movement of said second gyroscope and said support for controlling said second prime mover.

2. A master gyroscope system as in claim 1, including in combination an azimuth gyroscope supported by said support, said azimuth gyroscope being carried by a Cardan ring, and means for mounting said Cardan ring for rotation about an axis normal to said support.

3. A master gyroscope system, including in combination a platform, means for suspending said platform for rotation only about both a longitudinal axis and about a transverse axis, a first prime mover for applying torque to said platform about said longitudinal axis, a second prime mover for applying torque to said platform about said transverse axis, a first gyroscope having its spin axis in a plane normal to said platform carried by said platform for movement about a transverse axis, a second gyroscope having a spin axis in a plane normal to said platform carried by said platform for movement about a longtiudinal axis, means responsive to relative movement between said first gyroscope and said platform for controlling said first prime mover, means responsive to relative movement of said second gyroscope and said platform for controlling said second prime mover, and means for maintaining the spin axes of said gyroscopes in a true vertical direction.

4. A master gyroscope system as in claim 3 in which said means for maintaining the spin axes of said gyroscopes in a true vertical direction comprises a pair of bails, means for pivoting said bails about axes extending parallel to the plane of said platform, and means for generating torque between said bails and said gyroscopes adapted to precess said gyroscopes to a position with their spin axes in a true vertical direction.

5. A master gyroscope system as in claim 3 in which said means for maintaining the spin axes of said gyroscopes in a true vertical direction comprises electromagnetic means for creating torque about the tilt axes of said gyroscopes, and means for supplying an erecting potential to said electromagnetic means whereby to precess said gyroscopes to a position having their spin axes in a true vertical direction.

6. In a master gyroscope system, a platform, a gyroscope having a housing, a gyroscope wheel mounted for rotation within said housing about a spin axis, means for pivotally mounting said housing for rotation about an axis parallel to the plane of the platform and extending at right angles to the spin axis of said gyroscope wheel, a bail, means for pivoting said bail about an axis extending at right angles to the axis of rotation of said gyroscope housing, means driven by said gyroscope wheel for creating a torque about the axis of rotation of said gyroscope housing through said bail whenever the plane of the bail extends at a position which is not in alignment with the true vertical direction, co-acting means carried by said platform and said bail for selectively immobilizing said bail, and means responsive to acceleration for actuating said co-acting means to lock said bail.

7. In a master gyroscope system, a platform, a gyroscope having a housing, a gyroscope wheel mounted for rotation within said housing about a spin axis, means for pivotally mounting said housing for rotation about an axis parallel to the plane of the platform and extending at right angles to the spin axis of said gyroscope wheel, a bail, means for pivoting said bail about an axis extending at right angles to the axis of rotation of said gyroscope housing, means driven by said gyroscope wheel for creating a torque about the axis of rotation of said gyroscope housing through said bail whenever the plane of the bail extends at a position which is not in alignment with the true vertical direction, co-acting means carried by said bail and said platform respectively, adapted to selectively immobilize said bail, an electromagnet for operating said co-acting means to immobilize said bail, and means responsive to acceleration for controlling the energization of said electromagnet.

8. A master gyroscope system as in claim 7 in which said means responsive to acceleration includes an inverted pendulum, centering springs tending to hold said pendulum in a vertical position, and means adapted to complete circuits through said electromagnet when said inverted pendulum moves against the action of said centering springs.

9. A master gyroscope system adapted to be carried by a rapidly maneuverable craft, including in combination a platform, a gyroscope having a housing, a gyroscope wheel mounted for rotation within the housing about a vertical spin axis, means for pivotally mounting the housing for rotation about an axis parallel to the plane of the platform and extending at right angles to the spin axis of the gyroscope wheel, an erecting means for maintaining the spin axis of the gyroscope in a vertical position, an armature carried by the housing, electromagnetic means adapted to influence the armature to create a torque about the axis of rotation of the gyroscope housing, means for generating a potential having a desired characteristic, inertia means, means controllable by the inertia means for immobilizing the erecting means, circuit means for impressing the potential of desired characteristic upon the electromagnetic means to precess the gyroscope in accordance with the predetermined characteristic, and means responsive to the inertia means for rendering said circuit means operative simultaneously with the placing of the erecting means in inoperative condition.

CARL L. NORDEN.
WILLIAM C. COULBOURN.

REFERENCES CITED

The following references are of record in the file of this patent:

UNITED STATES PATENTS

| Number | Name | Date |
|---|---|---|
| 1,066,860 | Sparmann | July 8, 1913 |
| 1,236,993 | Sperry et al. | Aug. 14, 1917 |
| 1,324,477 | Tanner | Dec. 9, 1919 |
| 1,501,886 | Abbot | July 15, 1924 |
| 1,627,178 | Henry | May 3, 1927 |
| 1,733,531 | Dugan | Oct. 29, 1929 |
| 2,188,606 | Koster | Jan. 30, 1940 |
| 2,238,645 | Horn | Apr. 15, 1941 |
| 2,315,167 | Von Manteuffel et al. | Mar. 30, 1943 |
| 2,342,637 | Bechberger | Feb. 29, 1944 |
| 2,411,087 | Ford et al. | Nov. 12, 1946 |
| 2,412,481 | Summers | Dec. 10, 1946 |
| 2,417,573 | Strother | Mar. 18, 1947 |
| 2,423,270 | Summers | July 1, 1947 |
| 2,433,837 | Dawson | Jan. 6, 1948 |

FOREIGN PATENTS

| Number | Country | Date |
|---|---|---|
| 374,175 | Germany | Apr. 30, 1923 |
| 425,034 | Great Britain | Mar. 4, 1935 |
| 544,756 | Great Britain | Apr. 27, 1942 |